(12) United States Patent
Hua et al.

(10) Patent No.: US 7,904,815 B2
(45) Date of Patent: Mar. 8, 2011

(54) CONTENT-BASED DYNAMIC PHOTO-TO-VIDEO METHODS AND APPARATUSES

(75) Inventors: Xian-Sheng Hua, Beijing (CN); Lie Lu, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1437 days.

(21) Appl. No.: 10/610,105

(22) Filed: Jun. 30, 2003

(65) Prior Publication Data

US 2004/0264939 A1    Dec. 30, 2004

(51) Int. Cl.
*G06K 9/00* (2006.01)
*H04N 5/783* (2006.01)
(52) U.S. Cl. .......................................... 715/726; 715/720
(58) Field of Classification Search .......... 715/719–726, 715/730, 771–773, 853–854, 821–824; 348/155–156, 699–700, 14, 17, 20; 725/41; 382/115–118; 707/100, 102; 709/230; 345/723, 345/473–475; 375/240
See application file for complete search history.

(56) References Cited

U.S. PATENT DOCUMENTS

| | | | | |
|---|---|---|---|---|
| 5,548,322 A | * | 8/1996 | Zhou | 348/14.01 |
| 5,940,573 A | * | 8/1999 | Beckwith | 386/54 |
| 6,363,380 B1 | * | 3/2002 | Dimitrova | 707/6 |
| 6,560,281 B1 | * | 5/2003 | Black et al. | 375/240 |
| 6,664,531 B2 | * | 12/2003 | Gärtner et al. | 250/208.1 |
| 6,754,389 B1 | * | 6/2004 | Dimitrova et al. | 382/224 |
| 7,010,036 B1 | * | 3/2006 | Mory | 375/240.08 |
| 7,333,672 B2 | * | 2/2008 | Chatting et al. | 382/266 |
| 2001/0043727 A1 | * | 11/2001 | Cooper | 382/118 |
| 2002/0039481 A1 | * | 4/2002 | Jun et al. | 386/68 |
| 2002/0180803 A1 | * | 12/2002 | Kaplan et al. | 345/810 |
| 2002/0181741 A1 | * | 12/2002 | Masukura et al. | 382/103 |
| 2003/0038830 A1 | * | 2/2003 | Bean et al. | 345/719 |
| 2003/0133015 A1 | * | 7/2003 | Jackel et al. | 348/207.1 |
| 2004/0027367 A1 | * | 2/2004 | Pilu | 345/716 |
| 2004/0041831 A1 | * | 3/2004 | Zhang | 345/723 |
| 2004/0085578 A1 | * | 5/2004 | Quek et al. | 358/1.18 |
| 2004/0136574 A1 | * | 7/2004 | Kozakaya et al. | 382/118 |
| 2004/0201610 A1 | * | 10/2004 | Rosen et al. | 345/731 |
| 2006/0041908 A1 | * | 2/2006 | Kim et al. | 725/52 |

* cited by examiner

*Primary Examiner* — Steven P Sax
(74) *Attorney, Agent, or Firm* — Lee & Hayes, PLLC

(57) ABSTRACT

Methods and apparatuses are provided for automatically generating video data based on still image data. Certain aspects of the video may also be configured to correspond to audio features identified within associated audio data.

99 Claims, 5 Drawing Sheets

CONTENT-BASED DYNAMIC PHOTO-TO-VIDEO METHODS AND APPARATUSES

TECHNICAL FIELD

This invention relates to computers and software, and more particularly to methods, apparatuses and systems for providing content-based dynamic photo, image, video, and/or multimedia presentations/shows or other like performances using at least one computing device.

BACKGROUND OF THE INVENTION

Digital cameras are becoming more popular. One of the benefits to using a digital camera is that a plurality of images may be captured, stored, manipulated, edited, shared, etc., using the digital cameras and other computing resources. Digital images may also be captured from traditional film media with digital scanning devices. Some digital images are even created virtually using a computer, for example.

Once a collection of digital images has been captured and stored, the user needs to decide what to do with the digital images. There are a variety of different digital image handling tools available to users. By way of example, a user may edit all or part of a digital image with a photo editing application, transfer a digital image file to a server on the Internet or other like network to share the image with others, and/or print a selected digital image file. While such digital image handling tasks are typically accomplished using a computer, other devices may also be used. For example, some digital cameras and scanners have built-in image manipulation capabilities.

Traditional photography, as practiced by the average user, often resulted in the user simply collecting a box of photos or slides. More creative/organized users would combine the photos into photo albums or slide shows. Such organizing strategies have found there way into the digital image environment too. For example, there are computer applications/tools that allow users to organize digital images into virtual photo albums, web sites, collages, and/or slide shows.

For the designers/manufacturers of these and other like digital image handling tools there is an ongoing desire/need to provide the users with tools that are easier to use, more powerful and/or offer more options.

SUMMARY OF THE INVENTION

In accordance with certain aspects of the present invention, methods, apparatuses and systems are provided that automatically convert one or more digital images (photos) into one or more photo motion clip. The photo motion clip defines simulated video camera or other like movements/motions within the digital image(s). The movement/motions can be used to define a plurality or sequence of selected portions of the image(s). As such, one or more photo motion clips may be used to render a video output. The movement/motions can be based on one or more focus areas identified in the initial digital image. The movement/motions may include panning and zooming, for example.

In certain implementations, a photo motion clip and/or all or part of the video output may also be automatically associated with one or more audio clips. For example, the movement/motion of a photo motion clip may be configured to correspond with selected portions of an audio clip. In certain implementations, the transition between two photo motion clips within a video may be configured to correspond to selected portions of an audio clip.

The selected portions of the audio clip may include sub-music clips, for example, that may be determined based on detected changes in the energy level of the audio signal. Thus, in certain implementations, a beat and/or an onset may be detected in the audio signal and the movement/motions of the photo motion clip coordinated with certain beats/onsets to produce a pleasing video. The video may also transition (e.g., dynamically) from one photo motion clip to the next based on selected beats/onsets in the audio clip.

By way of further example, the above stated and needs and/or others are met by a method that includes accessing at least one initial digital image, determining at least one photo motion clip that includes a plurality of digital images based on at least one portion of the initial digital image, and generating output data based on at least the photo motion clip.

In certain implementations, the method also includes determining at least one audio clip. The audio clip may include, for example, a sub-music clip and the method may include selectively dividing music data into a plurality of sub-music clips. This can be accomplished, for example, by determining at least one boundary of at least one of the sub-music clips based on an audio signal energy level, at least one strong beat, and/or at least one onset in the music data. A boundary may also be defined based on a measured period of time.

The photo motion clip may include at least one portion of a digital image that is then associated with at least one sub-music clip. Some portions of the digital image may include focus area(s), such as, for example, facial image data, salience image data, and the like. The method may also include determining a confidence value associated with the focus area.

The photo motion clip may include a plurality of portions of a digital image. The method may further include determining a motion pattern to be applied to the motion clip. The motion pattern may be associated with selected focus area(s) and/or at least one sub-music clip, for example. The motion pattern may include, for example, still motion, light zooming-in motion, light zooming-out motion, panning motion, zooming-in motion, zooming-out motion, panning with light zooming-in motion, panning with light zooming-out motion, panning with zooming-in motion, panning with zooming-out motion, and/or other like motion effects.

The motion pattern may include at least a starting point and an ending point within the digital image and trajectory information associated with simulated virtual camera motion with regard to the digital image. The trajectory information may be associated with a time parameter and/or a speed control function. The speed control function can vary over time in a linear or non-linear manner. In certain implementations, the trajectory information is based on at least one arc length parameter The method may include generating at least one storyboard based on a plurality of photo motion clips. The method may also include rendering video data based on the audio clip and the photo motion clip. Here, for example, the video data may include at least two different photo motion clips that are associated different sub-music clips. The method may include applying at least one transition effect when transitioning from a first photo motion clip to a second photo motion clip. For example, a fade transition effect, a wipe transition effect, and/or other like transition effects may be used.

In still other implementations, the method may include applying at least one style effect to at least a stylized portion of image data within the photo motion clip when rendering the video. By way of example, a grayscale effect, a color tone effect, a sepia tone effect, a contrast effect, a watercolor effect, a brightness effect, and/or other like effects may be employed.

In certain implementations, the method includes generating script data based on the audio clip and the photo motion clip. This script data may then be used to render video data.

BRIEF DESCRIPTION OF THE DRAWINGS

A more complete understanding of the various methods and apparatuses of the present invention may be had by reference to the following detailed description when taken in conjunction with the accompanying drawings wherein.

DETAILED DESCRIPTION

Exemplary Computing Environment

Figure 1:
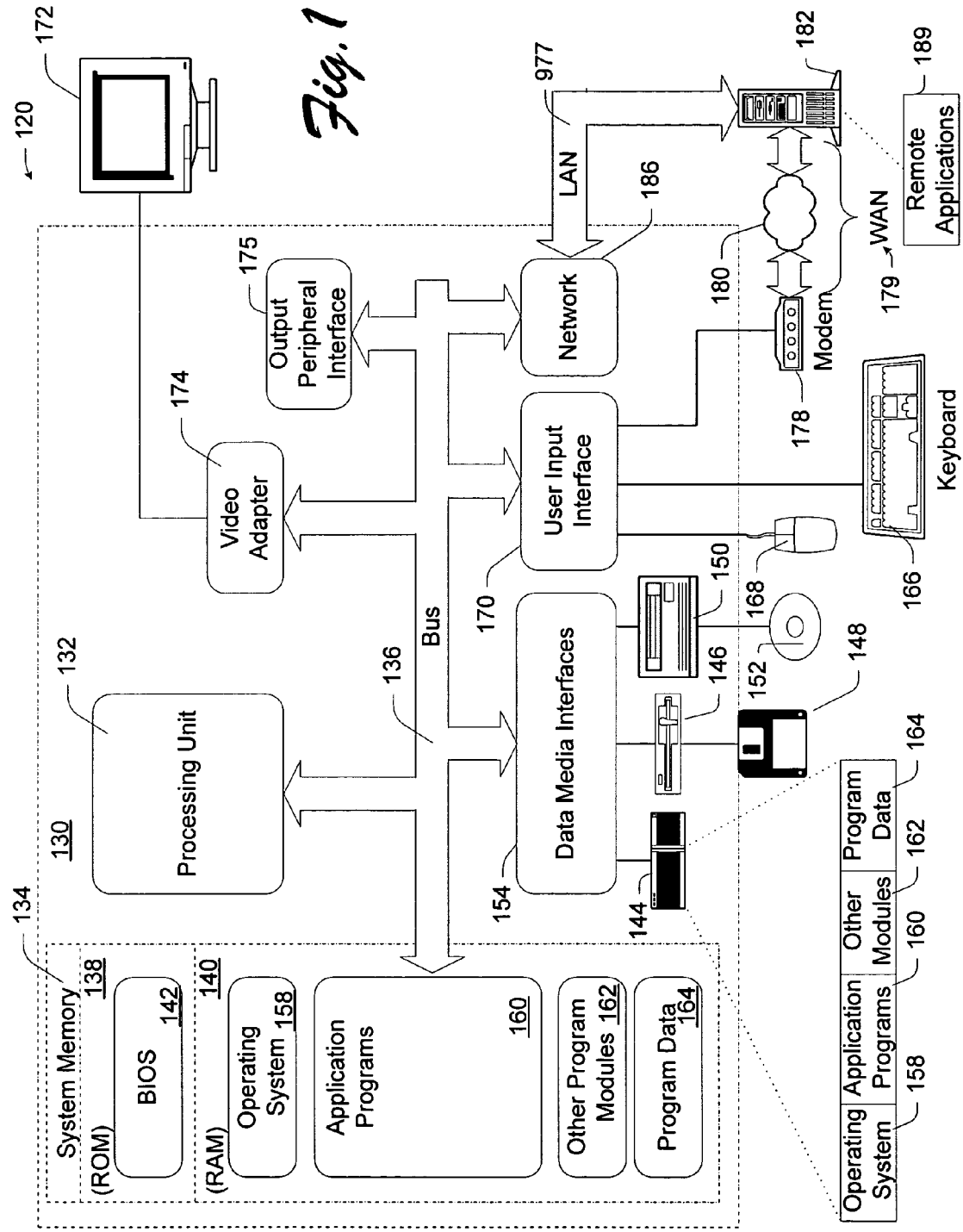
FIG. 1 is a block diagram depicting an exemplary computer system suitable for use performing the novel algorithm in logic, in accordance with certain exemplary implementations of the present invention.

FIG. 1 illustrates an example of a suitable computing environment 120 on which the subsequently described methods and arrangements may be implemented.

Exemplary computing environment 120 is only one example of a suitable computing environment and is not intended to suggest any limitation as to the scope of use or functionality of the improved methods and arrangements described herein. Neither should computing environment 120 be interpreted as having any dependency or requirement relating to any one or combination of components illustrated in computing environment 120.

The improved methods and arrangements herein are operational with numerous other general purpose or special purpose computing system environments or configurations.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and arrangements described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter

174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Introduction to Automated Photo Handling

Note that the term photo or photograph is used herein is meant to include any suitable form of digital image data that can be input to, manipulated by, output by, and/or displayed by a computing or other like device. Thus, the terms photo and image are essentially interchangeable in this description.

In accordance with certain aspects of the present invention, methods and apparatuses are provided that exploit the rich content embedded in a single photograph(image). Based on the process of a viewer's attention variation on objects or regions of an image, a photograph can be converted into a motion clip. Exemplary methods and apparatuses have been developed to automatically convert a photographic series into a video by simulating camera motions, set to incidental music of the user's choice. For a selected photographic series, an appropriate camera motion pattern (both the trajectory and speed) is selected for each photograph to generate a corresponding motion photograph clip. The output video is rendered by connecting a series of motion photograph clips with specific transitions based on the content of the images on either side of the transition. Each motion photograph clip can be aligned or substantially aligned with the selected incidental music based on music content analysis. The exemplary methods and apparatuses provide a novel way to browse a series of images and can provide for a system exploring the new medium between photograph and video.

Though static and two dimensional, a single photograph contains extremely rich content. Much research has been done to exploit the embedded information in a single photographic image. By way of example, Horry D. et al. in Tour into the Picture: Using a Spidery Mesh Interface to Make Animation from a Single Image, published In Proceedings of ACM SIGGRAPH 1997, show that animation can be created from the viewpoint of a camera which can be used to "walk or fly through" a two-dimensional (2D) photograph in a three-dimensional (3D) way. Boivin S. et al., in Image-based Rendering of Diffuse, Specular and Glossy Surfaces from a Single Image, published In Proceedings of ACM SIGGRAPH 2001, 107-116, for example, present a method to recover an approximation of the bidirectional reflectance distribution function (BRDF) of the surfaces present in a real scene from a single photograph. Others have described an interactive modeling and editing system that uses an image-based representation for the entire 3D authoring process.

When a person views a photograph, he/she often looks at it with more attention to specific objects or areas of interest after an initial glance at the overall image. In other words, viewing photographs can be considered a temporal process which brings enjoyment from inciting memory or possibly from rediscovery. This is well evidenced by noticing how many documentary movies and video programs often present a motion story based purely on still photographs by applying well designed camera operations. That is, a single photograph may be converted into a motion photograph clip by simulating temporal variation of viewer's attention using simulated camera motions. For example, zooming simulates the viewer looking into the details of a certain area of an image, while panning simulates scanning through several important areas of the photograph. Furthermore, a slide show created from a series of photographs is often used to tell a story or chronicle an event. Connecting the motion photograph clips following certain editing rules forms a slide show in this style, a video which is much more compelling than the original images. Such a video composed from motion photograph clips is a new medium that captures the story-telling of image viewing/sharing and enhances the enjoyment of the photograph viewing process. In this description, methods and apparatuses are described that include a scheme referred to as photo-to-video. The photo-to-video scheme is configured to automatically convert photographs into video by simulating temporal variation of people's study of photographic images using simulated camera motions. The photo-to-video methods and apparatuses can be configured using logic. The term logic as used herein is meant to represent any form of logic that can perform the acts/functions required. Hence, for example, logic may include software, hardware, firmware, or some combination thereof.

There are several tasks to consider in automatically converting from photographs to video. One task is focus area detection. Another task includes motion pattern (MP) selection. Yet another task is motion generation.

The terms focus or focuses as used herein, refer to one or more targeted areas or areas of interest within one or more photographs that the simulated camera will pan from/to, and/or zoom into/out-from, for example.

Selecting appropriate motion patterns to generate a motion photograph clip for an image with given focus areas can be difficult. By observing professionally edited video programs, for example, it appears that panning and zooming are usually the most common or primary motion patterns. A particular photograph may have several acceptable motion patterns, such as zooming into a focus, or panning from one focus to another. However, if most of the photographs in a series have the same or similar motion patterns, the final video may appear too monotonous to the viewer. In this description an exemplary algorithm is described that can be employed to select suitable motion patterns for each photograph and/or for a photographic series, for example.

Generally, simulated camera motions are not just moving the focus window from one region to another, or zooming in/out to/from a specific region of the photograph. To generate motions on the basis of photograph features and determined motion pattern, definition of motion trajectory and motion speed along the trajectory should be determined. In this description, exemplary techniques are also provided that can be used to select panning trajectories and/or controlling panning/zooming speed, for example.

Photo Capturing/Generation

Figure 2:
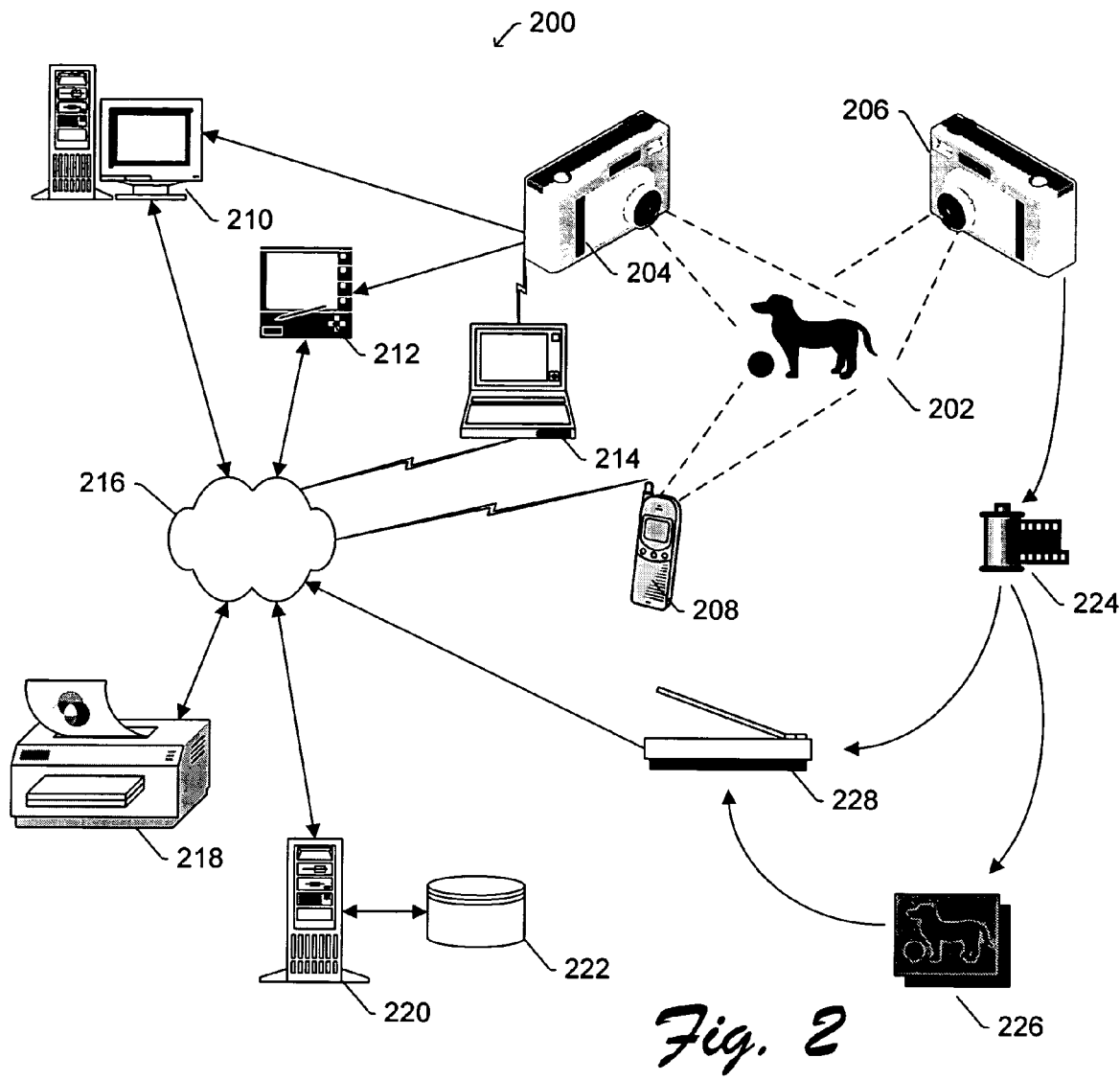
FIG. 2 is an illustrative diagram depicting various representative devices capable of capturing, processing and/or storing digital images, in accordance with certain implementations of the present invention.

Attention is drawn next to FIG. 2, which is an illustrative diagram depicting an arrangement 200 having various representative devices capable of capturing, processing and/or storing photos (digital images), in accordance with certain implementations of the present invention.

Here, a photo subject 202 is represented by a dog and ball. An image of photo subject 202 may be captured, for example, using a digital camera 204, a film camera 206 and/or some other device that can capture images such as an appropriately configured wireless phone 208. Digital camera 204 produces a digital image file that can be stored in memory within digital camera 204, for example, and/or transferred to a computing device. Representative computing devices include, for example, a personal computer 210, a pen-based computer 212, a laptop computer 214, or the like. The interface between digital camera 204 and a computing device may be wired or wireless. In certain implementations, a removable computer-readable media may be used to transport/transfer a digital image file between digital camera 204 and the computing device. In certain implementations, digital camera 204 may include all or part of a computing device, or vice versa.

The representative computing devices are depicted as being interconnected by communication network 216. In certain implementations communication network 216 may include a LAN, WAN, WLAN, the Internet, and intranet, a telephone system, a link, etc. Connected to communication network 216 in this illustrative arrangement is a printing device 218, and a server device or other like remote device 220. Here, remote device 220 is coupled to a database or other like storage capability 222 that can store digital image data transferred thereto. Also connected to communication network 216 is wireless telephone 208.

Film camera 206 captures an image of photo subject 202 to film 224. Film 224 is then processed to produce a printed image 226. Printed image 226 and/or film 224 are scanned using a digital scanner 228 to produce a corresponding digital image file similar to that produced, for example, by digital camera 204.

As illustrated in FIG. 2, there are a variety of techniques for capturing digital image files and transferring the digital image files to different devices that can further process or use the digital image files.

Figure 3:
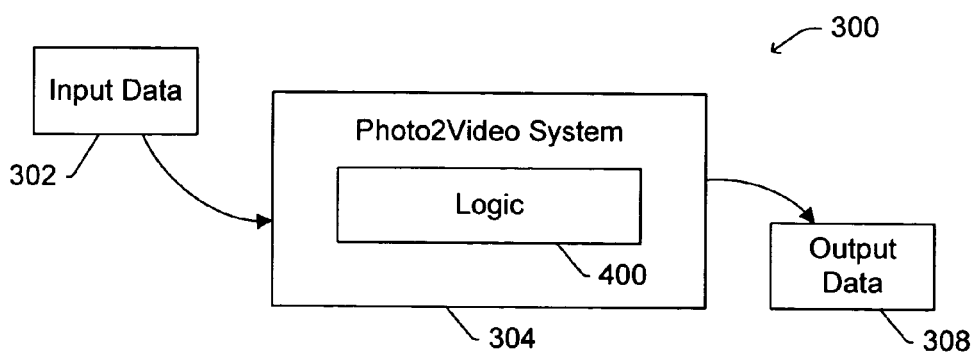
FIG. 3 is a block diagram depicting an exemplary photo-to-video system that accepts input data and produces output data, in accordance with certain implementations of the present invention.

FIG. 3 is a block diagram depicting an arrangement 300 that includes a photo-to-video system 304 that accepts input data 302 and produces output data 308, in accordance with certain implementations of the present invention. Photo-to-video system 304 includes logic 400 that supports the conversion process that produces output data 308 based on input data 302. Photo-to-video system 304 may be implemented in a variety of forms, including, for example, devices such as represented/shown in FIGS. 1 and/or 2.

Input data 302 may include data associated with digital image files, audio files, multimedia data, application data, system parameters, user inputs, and/or any other useful data that logic 400 may consider/process. Output data 308 may include any type of data as input data 308, and/or others. As described in greater detail below, in accordance with certain aspects of the present invention output data 308 includes video data and/or other like data.

Photo-To-Video System Overview

Figure 4:
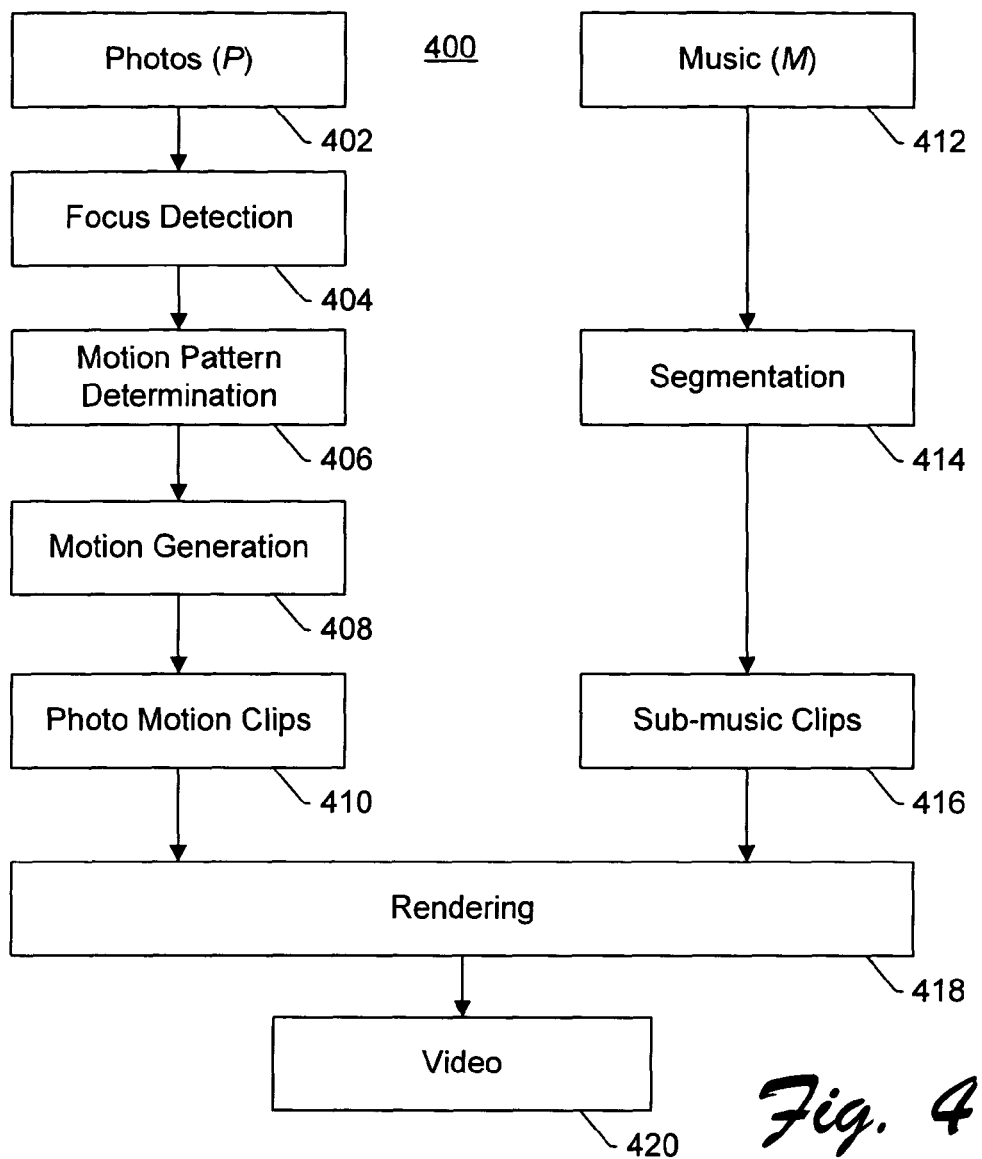
FIG. 4 is a block diagram depicting logic that may be implemented in a digital image handling tool, computer device, computer-readable media, and the like, in accordance with certain implementations of the present invention.

FIG. 4 is a flow diagram illustrating certain exemplary features/acts/functions of logic 400. At a high-level, logic 400 has inputs that include photos (P) 402 and music (M) 412 and outputs that includes video 420. Logic 400 also includes three capabilities, namely a motion photograph clip generation capability represented by acts 404-408, a music segmentation capability represented by act 414, and a rendering capability represented by act 418. The rendering capability includes as inputs photo motion clips 410 and sub-music clips 416.

The primary component is motion photograph clip generation, which includes focus detection act 404, motion pattern determination act 406, and motion generation act 408.

Focuses are areas in a photograph that most likely will attract a viewer's attention or focus. Focuses can therefore, once identified in act 404, be used to determine simulated camera motions in act 406 that are to be applied to the image. In act 404, the focuses may include, for example, human faces that are detected within a photo using a robust face detection algorithm (see, e.g., Li, S. Z. et al. Statistical Learning of Multi-View Face Detection. Proceeding of ECCV 2002), and/or other visual attention areas detected by using a saliency map-based attention model (see, e.g., Li, Y., Ma, Y. F., and Zhang, H. J. Salient region detection and tracking in video. IEEE Int. Conference on Multimedia and Expo (ICME2003), Baltimore, USA, July 2003), or other like techniques.

In motion generation act 408, motion trajectory parameter(s) and related duration parameter(s) for showing a picture are determined based on the detected focuses in the image as identified in acts 404-406. Based on this generated trajectory and duration, a series of motion portions (e.g., rectangles or the like) for the original photograph are generated along the trajectory. Video frames of the motion photograph clip are then constructed in rendering act 418, for example, by resizing the sub-photographs defined by the motion portions.

The incidental music can be segmented in act 414 into sub-clips 416, for example, by detecting strong beats. Each music sub-clip 416 can then be used for one photograph. That is, the display duration of one motion photograph clip can be equal to, or substantially equal to, the duration of the corresponding music sub-clip. Also, transitions applied in rendering act 418 between two motion photograph clips may occur at or substantially near detected music beats such that motion photograph clip boundaries and music sub-clip boundaries are significantly aligned in rendering act 418. Additionally, transition effect(s) between two pr more motion photograph clips can be determined using the content of the associated photos.

The following sections describe in more detail exemplary techniques for use in focus detection, motion pattern determination, motion generation, music segmentation, and video rendering.

Focus Detection Techniques

As aforementioned, focuses can include target areas in the photographs that the simulated camera will pan from/to, or zoom in/out. It is assumed in this exemplary system that the focuses of the simulated camera are those areas in the photographs that most likely attract viewers' attention. Typically, this includes human faces within the image. As such, a face detector, for example, similar to the one in *Statistical Learning of Multi-View Face Detection* (cited above) can be applied to capture dominant faces in the photographs. Faces may also be detected using other applicable known techniques.

In certain exemplary implementations, act 404 is configured to only count faces that are not smaller than a defined size (e.g., 100×100 pixels). The confidence of a particular face detection result (rectangle) A is denoted by conf (A), which is output by the face detector.

Other than detecting faces, *Salient Region Detection And Tracking In Video* (cited above), for example, describes a saliency-based visual attention model that can be used for static scene analysis. This approach or others like it can be used to detect attention areas in photos 402. Attention areas that have overlap with faces can be removed. Similar to face detection, the confidence of a particular attention area A is also denoted by conf (A).

Faces and attention areas with high confidence (e.g., greater than about 0.5) are taken as the attention focuses of the photographs. The focuses can also be sorted 11 by their confidences (e.g., in a descending order). In certain implementations, face focuses may be arranged to have precedence over other types of attention areas. The sorted focuses of a particular photograph is denoted by $$F = \{F_l(x_l, y_l), 0 \leq l < L\} \quad (1)$$

where L is the number of attention focuses detected in the photograph, $(x_l, y_l)$ is the center coordinate of a focus. The average confidence of all focuses $conf_L(F)$ can be used to indicate the confidence of F as, $$conf_L(F) = \frac{1}{L}\sum_{l=0}^{L-1} conf(F_l) \quad (2)$$

If both face and attention areas are not detected in a photograph or none of them has high enough confidence, then no focus may be considered. In certain implementations, logic 400 can be configured to allow users to interactively assign or otherwise modify detected focus areas for a photo.

Motion Pattern Determination

Motions through a particular image can be generated according to the detected focuses. This section defines a number of exemplary motion patterns, and describes how logic 400 may choose appropriate motion patterns for a particular photograph and the entire photographic series, for example, by solving an integer programming problem.

Exemplary Motion Pattern Definition

Observing professionally edited videos, shows that there are two primary motion patterns: panning and zooming, and they are often used in combination to generate more expressive motion patterns. Based on such observations, in accordance with certain exemplary implementations, eight basic motion patterns MP={$mp_j$, $0 \leq j < N$} are defined as the following:

1. Still ($mp_0$): No motion effect.
2. Light Zooming-in ($mp_1$): Starting from covering the entire photograph, zoom in to the center in a limited degree.
3. Light Zooming-out ($mp_2$): Zooms out to cover the entire photograph from a slightly smaller inner rectangle.
4. Panning ($mp_3$): Pan from one focus to another, or through a few focuses.
5. Zooming-in ($mp_4$): Zoom in to a focus from covering the entire photograph.
6. Zooming-out ($mp_5$): Starting from a focus, zoom out to cover the entire photograph.
7. Panning with Zooming-in ($mp_6$): Pan from focus A to focus B, while at the same time zooming in to B.
8. Panning with Zooming-out ($mp_7$): Pan from focus A to focus B, while at the same time zooming out to larger rectangle that contains B.

Figure 5:
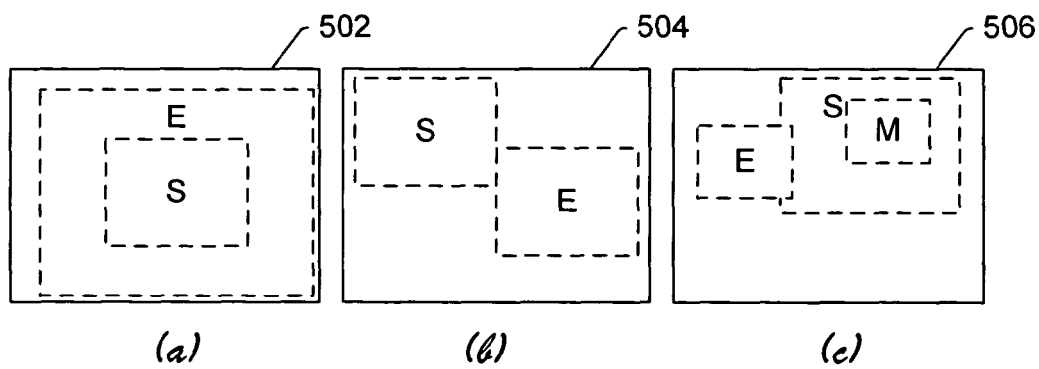
FIG. 5(a-c) are illustrative diagrams showing zooming and panning within images, in accordance with certain implementations of the present invention.

In the above definition, (2) and (3), which are separated from (5) and (6), are particularly useful for the photographs in which no focus was detected. Such motion patterns can be represented, for example, in a uniform manner using a start portion (e.g., rectangle) and end portion (e.g., rectangle) in the original photo as shown in the examples in FIG. 5.

For example, when zooming-out, as shown in FIG. 5(a), within image 502 the end rectangle (E) is the biggest inner rectangle that has the same height-width ratio as that of the output video frame, while the start rectangle (S) is a smaller one with the same center. For panning, as shown in FIG. 5(b), within image 504 the start rectangle (S) and end rectangle (E) have the same size but different center. Zooming and panning effects can be combined, for example, as shown in FIG. 5(c). Here, start rectangle (S) is zoomed/panned to middle rectangle (M), which leads eventually to end rectangle (E).

For the purpose of this uniform representation of motion patterns, another issue then is to determine the exact location and size of start/end portion (rectangle). In logic 400, to promote smoothness of the simulated camera motions, as well as to keep an acceptable level of the content viewable in the output video, start and end rectangles for a certain motion pattern can be defined using rules such as the following:

a. In the output video, the average "steps" of panning and zooming is as close as possible to one pixel, which guarantees the smoothness of the simulated camera motions. In certain implementations, the average steps are also not greater than one pixel.
b. For motion pattern involving zooming in (out), the start (end) rectangle is the maximal sub-rectangle within the photograph which has the selected focus exactly in, or substantially close as possible to(if rule (c) cannot be satisfied), the rectangle center while the height-width ratio equal to that of the output video.
c. The size of start/end rectangle should not be smaller than the frame size of the output video and the corresponding detected faces or attention areas.

From these exemplary rules, frame rate and the duration of the corresponding sub-music clip, the location and size of the start/end rectangle are uniquely determined by logic 400.

Compound motion patterns are reasonable combinations of the eight basic patterns (and/or others as applicable), such as "zooming in-panning" and "panning-still-zooming out". Compound motion patterns also may be represented uniformly by a series of rectangles (see, e.g., FIG. 5(c)).

Motion Pattern Selection

In general, the manner in which a user studies a picture is strongly related to the focuses, and in particular, the number of focuses vying for the user's attention. For example, a photograph with a single focus most likely will lead the viewer to concentrate on the details of that focus after the first glance of the entire photograph. Additionally, some other semantic features as whether the photograph is taken indoors or outdoors, and whether the photo includes a landscape or a cityscape, etc., also provide cues that can be used to select appropriate motion pattern for a particular photo. For example, outdoor and landscape photographs typically have more types of acceptable motion patterns than might indoor or cityscape photographs. Accordingly, in order to choose appropriate motion patterns for a particular photograph and a photographic series, an MP suitability matrix M=($m_{ij}$) 8×8 or other like mechanism can be defined according to the number of detected focuses in a photo and some semantic features. By way of example, attention is drawn to Table 1 below.

An Adaboost-based classifier, such as, for example, presented by Zhang, L. et al., titled Boosting Image Orientation Detection with Indoor vs. Outdoor Classification, from the IEEE Workshop on Applications of Computer Vision, Dec. 3-4, 2002, the Orlando World Center Marriott, Orlando, Fla. USA, or other like techniques can be employed to determine if a given photo is classified as being a landscape, a cityscape, taken indoors or outdoors. The number of attention focuses in a particular photograph and the corresponding confidence are determined by the aforementioned method in the focus detection section above.

TABLE 1

MP suitability matrix

| $Pr_i$ | Prop. | $mp_0$ | $mp_1$ | $mp_2$ | $mp_3$ | $mp_4$ | $mp_5$ | $mp_6$ | $mp_7$ |
|---|---|---|---|---|---|---|---|---|---|
| 0 | 0 Focuses | 0.250 | 0.250 | 0.250 | 0.000 | 0.000 | 0.125 | 0.000 | 0.125 |
| 1 | 1 Focus | 0.000 | 0.125 | 0.125 | 0.000 | 0.375 | 0.375 | 0.000 | 0.000 |
| 2 | 2 Focuses | 0.000 | 0.000 | 0.000 | 0.250 | 0.125 | 0.125 | 0.250 | 0.250 |
| 3 | >2 Focuses | 0.125 | 0.000 | 0.000 | 0.375 | 0.125 | 0.125 | 0.125 | 0.125 |
| 4 | Indoor | 0.250 | 0.250 | 0.250 | 0.000 | 0.000 | 0.125 | 0.000 | 0.125 |
| 5 | Outdoor | 0.000 | 0.125 | 0.125 | 0.250 | 0.125 | 0.250 | 0.125 | 0.250 |
| 6 | Cityscape | 0.125 | 0.250 | 0.250 | 0.000 | 0.000 | 0.125 | 0.125 | 0.125 |
| 7 | Landscape | 0.000 | 0.125 | 0.125 | 0.250 | 0.125 | 0.250 | 0.125 | 0.250 |

As listed in Table 1, logic 400 can assume whether the photograph has 0, 1, 2 or more focuses, whether it is taken indoors or outdoors, whether it is cityscape or landscape are eight properties of the photograph, denoted by $$\text{Prop} = \{Pr_k, 0 \leq i < 8\} \quad (3)$$

The eight rows Table 1 represent exemplary basic suitability degrees of the eight motion patterns for images that has the corresponding properties. This exemplary MP suitability matrix was obtained though experiments and empirical analysis, in which users were required to assign a three-level value, 1 ("good"), 0.5 ("average"), and 0 ("bad"), to each motion pattern for each test photograph. Then for each pair of image property and motion pattern, the suitability value was obtained by averaging, normalizing and quantizing the corresponding scores. In other implementations, more sophisticated methods, such as, for example, learning from professionally edited videos, can be adopted to determine the MP suitability matrix.

Suppose all photographs to be converted into a video are represented as $$P = \{p_k, 0 \leq k < n\} \quad (4)$$

where n is the total number of photographs.

Suppose further that the possibility or confidence that a particular photograph $p_k$ has property $Pr_i$ is denoted by $p(p_k, Pr_i)$, then the suitability value for applying motion pattern $mp_j$ on $p_k$ is $$h_j(p_k) = \sum_{i=0}^{7} P(p_k, Pr_i) \cdot m_{ij} \quad (5)$$

Those skilled in the art will recognize that more/other photograph properties or features that facilitate motion pattern selection can be used in this manner.

Suppose θ is a solution of MP selection for all photographs in P, defined by $\theta(p_k) = j$, if we apply $mp_j$ on $p_k$, then the set of all feasible solutions is denoted by Θ.

For a series of photos, one exemplary scheme to assign motion patterns includes maximizing the overall motion suitability on all photographs, to determine $$\theta^* = \underset{\theta \in \Theta}{\operatorname{argmax}} S(\theta) \quad (6)$$

where $$S(\theta) = \sum_{k=0}^{n-1} h_{\theta(p_k)}(p_k). \quad (6)$$

However, maximizing MP suitability without any global consideration may lead to monotony and a "boring" effect caused by the same motion patterns applied consecutively to sequentially adjacent photographs. A solution to this issue includes re-arranging the image order to make each motion pattern nearly uniformally distributed in the photographic series. Often times, the time order of the photographs is fixed as the photographic series is telling a "story" about an event. Accordingly, a better solution may be to add a distribution uniformity (DU) constraint or the like to the optimization problem.

To measure the uniformity of certain motion pattern $mp_j$, logic 400 can divide the output video into $N_i$ segments, where $N_i$ is the total number of $mp_j$ applied to the photographic series. The uniformity of $mp_j$, denoted by $H_j(\theta)$, can be measured by the normalized entropy of the motion pattern's distribution in the $N_i$ segments, for example.

Although the distribution uniformity of each motion pattern $mp_j$ can be constrained by a chosen threshold $h_j$, the appearance rate for each motion pattern may vary significantly. For example, sometimes half of the photographs may have the same particular motion pattern. This issue may be resolved using a constraint to control the appearance rate of different motion patterns.

Suppose under solution θ, the correlation coefficient of the actual appearance rate of $\{mp_j, 0 \leq j < N\}$ and desired appearance rates (DAR) is denoted by $R(\theta)$. Then the constraint to control appearance rates is $R(\theta) \geq r_0$, $r_0$ a predefined threshold.

Consequently, the motion effect selection problem is formulated as the constrained integer programming program shown in Equation 7.

$$\theta^* = \underset{\theta \in \Theta}{\operatorname{argmax}} S(\theta) \quad (7)$$

subject to $H_j(\theta) \geq h_j$, $R(\theta) \geq r_0$

Figure 6:
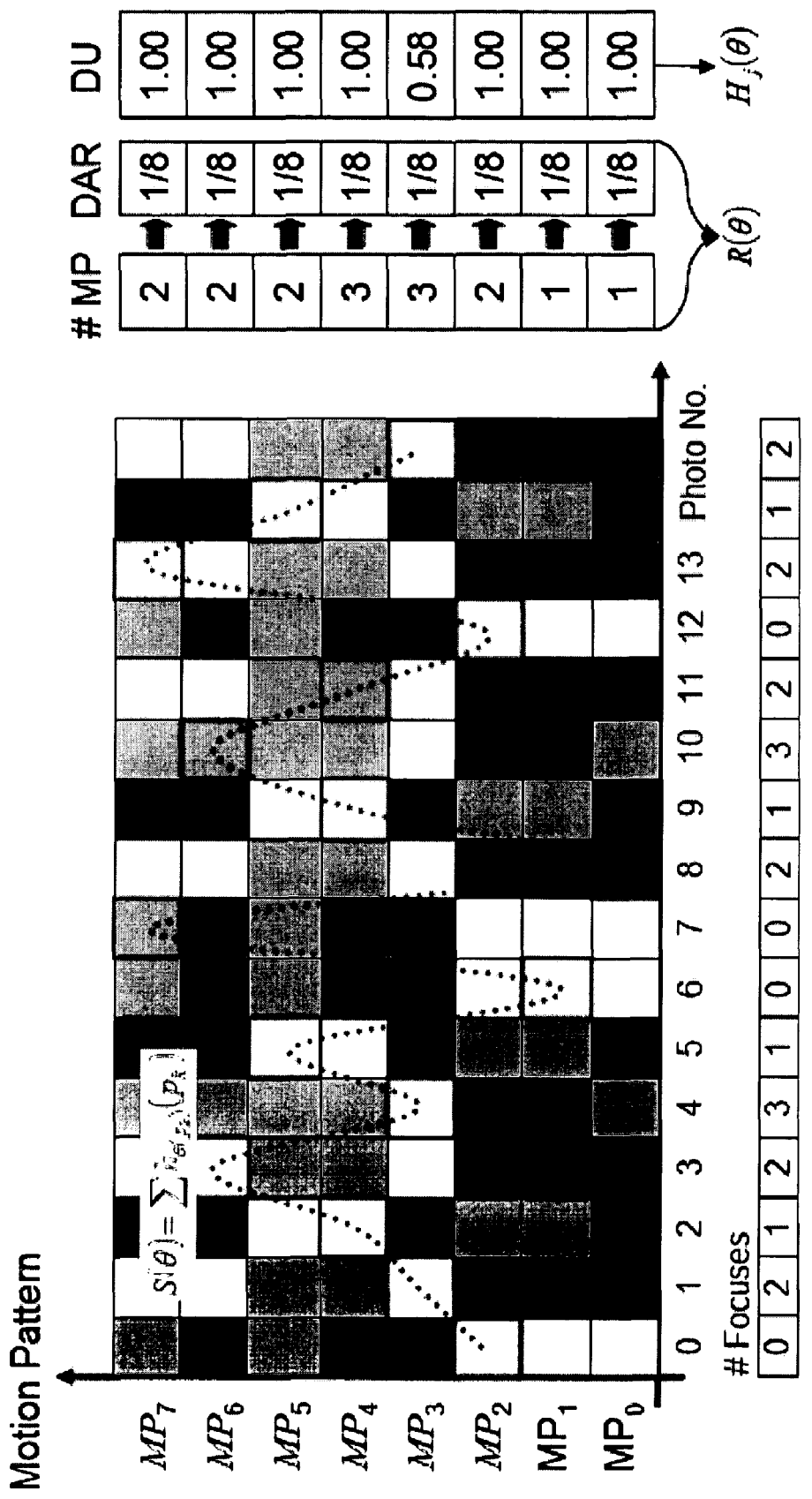
FIG. 6 is an illustrative graph showing motion pattern selection, in accordance with certain implementations of the present invention.

In the above equation $r_0$, and $h_j$, $0 \leq j < N$, are predefined target thresholds. FIG. 6 is an illustrative diagram showing a solution for an example photographic series, in which the gray level of the blocks illustrate the suitability values of corresponding pairs of photograph and motion pattern. The brighter the block is, the more suitable it is for selecting the motion pattern for the photograph. Conversely, the darker the block is the less suitable it is for selecting the motion pattern.

When n and N are large, the optimization search space is very large and logic 400 may not solve the problem even using an exhaustive search. On the other hand, it is obvious that the optimization problem (e.g., equation (7)) is not a simple linear programming problem, so it is very difficult to find an analytical solution. Therefore, in accordance with certain implementations, logic 400 is configured to use a heuristic searching algorithm or other like algorithm. An exemplary heuristic searching algorithm is described by Platt, J. in AutoAlbum: Clustering Digital Photographs using Probabilistic Model Merging, published in IEEE Workshop on Content-Based Access to Image and Video Libraries, 2000. This exemplary heuristic algorithm can determine solutions approaching the global optimum.

Motion Generation

Motion patterns involving panning require defining the trajectories. It is assumed that the motion trajectory of a simulated camera is a curve that connects all the targeted focuses. For example, if a motion pattern is a panning from focus $F_1$ to $F_0$, the center trajectory may be the straight line segment $\overline{F_1F_0}$. For example, see FIG. 7(a-b), wherein image 702 in FIG. 7(a) includes three targeted focuses $F_1$ 704, $F_2$ 706 and $F_3$ 708 and in FIG. 7(b) these targeted focuses are associated with a trajectory 710 flowing from $F_1$ 704 to $F_2$ 706 and then to $F_3$ 708. In addition, a related panning speed along trajectory 710 and (if applicable) zooming speed define the requisite motion pattern.

Panning Motion Trajectories

Figure 7:
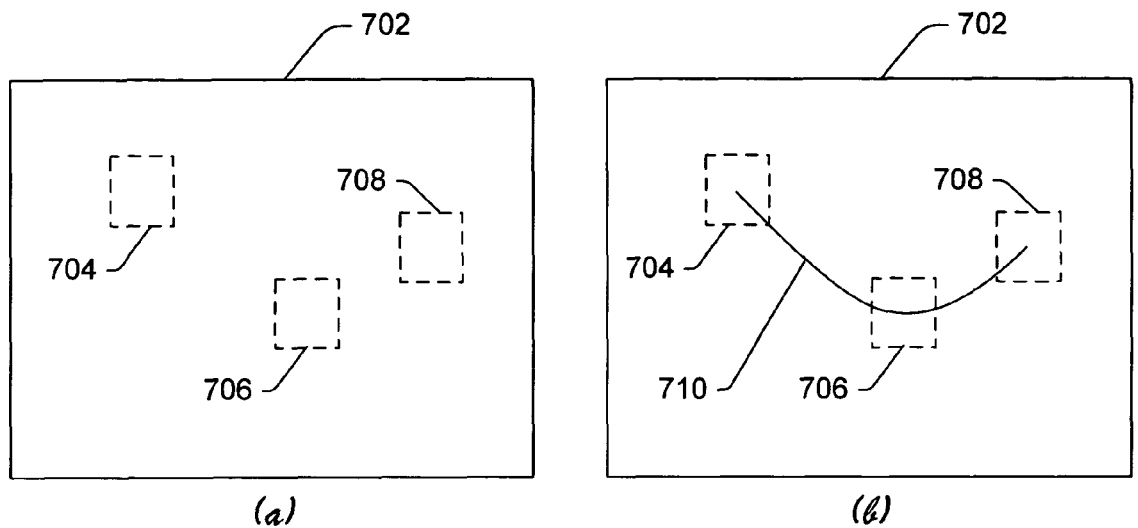
FIG. 7(a-b) are illustrative diagrams depicting focus areas and a panning trajectory there between, in accordance with certain implementations of the present invention.

In exemplary logic 400, if there are more than two focuses, the panning trajectory may be defined by an open interpolating curve across the centers of all the focuses. Suppose the curve is denoted by a parametric function $$f(\tau)=(x(\tau),y(\tau)) \qquad (8)$$

where $\tau$ is the parameter. Those skilled in the art will recognize, however, that there are many possible solutions for such a curve. Generally, when shooting with real video camera, the trajectory will not vary quickly, but instead move smoothly and steadily. In logic 400, for example, a cubic interpolating spline with the smallest maximal curvature (e.g., maximal value of the curvature along the trajectory) can be used for the panning trajectory. FIG. 7(a-b) illustrate such an example of panning trajectory of a particular photograph with the three focuses $F_1$ 704, $F_2$ 706 and $F_3$ 708.

Suppose the set of all possible permutations of all focuses in F is denoted by $F^*=\{F^{(i)}, 0 \leq i < L!\}$, where $$F^{(i)}=\{F_l^{(i)}(x_l^{(i)},y_l^{(i)}), 0 \leq l < L\} \qquad (9)$$

Actually, each $F^{(i)}$ defines a possible solution of the curve. For convenience, the parametric function of the solution is denoted by $f_i(\tau)=(x_{i(\tau)},y_i(\tau))$. $x_i(\tau)$ and $y_i(\tau)$ are two cubic interpolating splines defined by $\{(s_l^{(i)},x_l^{(i)}),0 \leq l < L\}$ and $\{(s_l^{(i)},y_l^{(i)}),0 \leq l < L\}$, where $s_l^{(i)}$ is the length of the broken line $\overline{F_0^{(i)}F_1^{(i)}\Lambda F_l^{(i)}}$, which is a rough estimation of the interpolating curve. According to the above definition, the parameter $\tau$ in $f_i(\tau)$ is close to an arc length parameter.

As $f_i(\tau)$ has a continuous second-order derivative, the maximal curvature of this curve is defined by $$\kappa_1 = \max_\tau \frac{|f_i'(\tau) \times f_i''(\tau)|}{|f_i'(\tau)|^3} \qquad (10)$$

Among the L! possible solutions, the one having minimal $\kappa_i$ can be chosen as the panning trajectory.

Because there are often not many focuses (rarely are there more than 5), an exhaustive search may be employed to find the optimal solution.

In other implementations, to reduce the computational complexity, logic 400 may be configured to connect focuses by straight line segments, and maximize the minimum of the inclinations between each pair of adjacent line segments. Then, for example, the line segments can be replaced with continuous cubic spline.

Panning Speed Control

Figure 8:
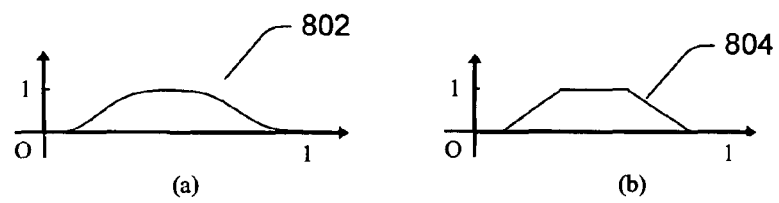
FIG. 8(a-b) are graphs showing speed controlling functions, in accordance with certain implementations of the present invention.

Panning speed control can be applied to determine the panning speed along the trajectory. Typically real camera motion will be slower at the beginning and the end. This sometimes called an ease-in and an ease-out. Logic 400 can employ a predefined or programmable speed control capability that is applied to set the panning speed at any position. Some exemplary speed control graphs are represented in FIG. 8(a-b) by lines 802 and 804, respectively. Other speed control capabilities may be used.

In accordance with certain implementations, the panning speed is set proportional to the speed control function. For computational convenience, firstly one can transfer the parameter $\tau$ of $f_i(\tau)$ into arc length parameter by a transformation function $s=s(\tau)$, where s is arc length parameter. Generally it is not easy to obtain explicit expression of $s(\tau)$. However, as aforementioned, according to the definition of $f_i(\tau)$, $\tau$ is close to arc length parameter. So, in certain implementations, $f_i(\tau)$ is applied instead of $f_i(s)$.

To control the panning speed, one can convert the arc length parameter s to time parameter t by a transformation function $s=s(t)$, where $0 \leq t \leq T$ and T is the duration of the corresponding motion photograph clip. Thus the time-parameterized function of the trajectory is obtained, while the location of the motion rectangle at any time is uniquely determined by such a function. Accordingly, the issue is converted to solving the parameter transformation function $s(t)$. Here, for example, $s(t)$ can be determined by the speed control capability as follows.

Panning speed can be set to be proportional to a speed controlling function $v=v(t) \geq 0$, $0 \leq t \leq 1$, such that $$|f'(t)|=\lambda v(t/T) \qquad (11)$$

where $\lambda$ is a const.

As $f'(t)=f'(s)s'(t)$ and $|f'(s)|=1$, then $$s'(t)=\lambda v(t/T) \qquad (12)$$

As $s(0)=0$ and $$\int_0^T |f'(t)|dt = \int_0^T s'(t)dt = S \qquad (13)$$

then $$s(t) = \frac{S\int_0^t v(x/T)dx}{T\int_0^T v(x)dx} \qquad (14)$$

Consequently, according to $f(t)=f(s(t))$, an accurate location of the motion rectangles in the photograph at any time t is uniquely determined, while panning speed is controlled by the speed control function $v(t)$.

Zooming Speed Control

Zooming speed control is employed to control the size variation of the motion rectangles. Suppose the width (height) of the first and end rectangles are denoted by $w_s(h_s)$ and $w_c(h_c)$, respectively, and the size variation factor at time t is denoted by $g(t), 0 \leq t \leq T$. Then the width and height of the motion rectangle at time t are $w(t)=w_sg(t)$ and $h(t)=h_sg(t)$. Suppose zooming speed is controlled by a zooming speed controlling function $u=u(t) \geq 0$, $0 \leq t \leq 1$, then $$g'(t)=\epsilon u(t/T) \qquad (15)$$

As $g(0)=1$ and $g(T)=w_e/w_s=h_e/h_s$, then $$g(t) = \frac{(w_e - w_s)\int_0^t u(x/T)dx}{w_s T \int_0^t u(x)dx} + 1 \quad (16)$$

The typical observed speed control functions for zooming are similar to those used for panning. Indeed, for example, in certain implementations logic 400 uses the same speed control function as illustrated in FIG. 8(b) for both panning and zooming.

Rendering

After the motion patterns are determined for the entire photographic series, logic 400 constructs video with and based on the selected incidental music. In the output video, short transitions can be designed to be coincident to moment of key music beats or other like detected audio features. To achieve this objective, the incidental music can be segmented into sub-music clips 416 (FIG. 4) by detecting strong beats which are then taken as boundaries. That is, motion photograph clip boundaries and sub-music boundaries are aligned or substantially aligned.

A method similar to that described by HUA, Xian-Sheng, LU, Lie and ZHANG, Hong-Jiang, Content-Based Photograph Slide Show with Incidental Music, 2003 IEEE International Symposium on Circuits and System, Bangkok, Thailand, for example, can be applied to detect the beats in the music, wherein the beat strengths are denoted by $$\text{Beat}=\{\text{beat}_k, 0 \leq k < K\} \quad (17)$$

wherein k is a sub-music index and K is the total number of sub-music clips.

In certain implementations, instead of detecting exact beat series, a possibly simpler scheme may be used to detect onsets. The strongest onset in a window is supposed as a beat. This is reasonable because there are many beat positions in a window (for example, 3 second); thus, the most possible position of a beat is the position of the strongest onset.

To detect onset sequence, for example, an octave-scale filter-bank can be applied to divide the music frequency domain into several sub-bands:

$$\left[0, \frac{\omega_0}{2^n}\right), \left[\frac{\omega_0}{2^n}, \frac{\omega_0}{2^{n-1}}\right), \ldots \left[\frac{\omega_0}{2^2}, \frac{\omega_0}{2^1}\right] \quad (18)$$

wherein $\omega_0$ refers to the sampling rate and n is the number of sub-band filters. In certain exemplary implementations, for example, seven sub-bands are employed.

After amplitude envelope is extracted from each sub-band, a Canny operator is applied to estimate its difference curve. Then, the sum of the difference curves in each sub-band is used to extract onset sequence. Each peak in the sum curve is considered as an onset, and peak value as the onset strength.

In certain implementations, to produce an acceptable user perception, it was found that the sub-music should not be too short or too long. Thus, in certain instances the length of sub-music clip was limited to about 3-5 seconds. For example, the sub-music can be segmented such that given a previous boundary, the next boundary is selected as the strongest onset in the window which is about 3-5 seconds from the previous boundary.

A number of common transitions, such as, for example, a cross-fade, a wipe, or the other like conventional transitions, can be employed to connect all motion photograph clips into one video file accompanied by the incidental music. The transitions occur exactly at and/or overlap the boundaries of music sub-clips. The transition type between two motion photograph clips, for example, can be determined based on a determined similarity between the two corresponding photos and the transition duration can be determined by beat strength, for example, as described by the following equations, $$\text{Transition Type}_k = \begin{cases} \text{Cross Fade, if } Sim(p_k, p_{k+1}) \geq \delta \\ \text{Randomly chose from others, otherwise} \end{cases} \quad (19)$$

$$\text{TransitionLength}_k = 1 - \text{beat}_k \quad (20)$$

where $Sim(p_k, p_{k+1})$ is a similarity measure between two photographs (e.g, see Platt, John, AutoAlbum: Clustering Digital Photographs using Probabilistic Model Merging, IEEE Workshop on Content-Based Access to Image and Video Libraries, 2000) and $\delta$ a predefined threshold.

More complex transition selection methods and more types of transition effects can be easily adopted by taking into account more features of the photos and music as well as the user's preferences.

To give the output video structural information, photographs can be clustered into several groups using various techniques. For example, the techniques proposed in *AutoAlbum: Clustering Digital Photographs using Probabilistic Model Merging* (cited above) may be used.

The first photograph of each cluster can be selected to represent the corresponding cluster. A so-called storyboard photograph can then be generated by patching images (e.g., thumbnail images) of these selected photos together into one image. Logic 400 can then include/insert this storyboard photograph before the first photograph of each cluster. The motion pattern of this storyboard photograph in each cluster can be fixed as "zooming into the corresponding thumbnail to be shown".

Clusters and/or the storyboard may also be associated with scenes/chapters in the resulting video.

It is observed from professionally edited videos that matching motion patterns with the tempos of the incidental music will make the video more expressive. Thus, in certain implementations, logic 400 is further configured to determine motion speed based on the tempo of the corresponding sub-music clip.

Users may have different preferences on the schemes to generate motion and determine motion patterns, as well as the transitions. A number of rendering styles can be determined based on user input/study. Additionally, video effects such as grayscale, sepia tone, watercolor, and the like can be applied on motion photograph clips according to user's preferences.

The photo-to-video system also can be regarded as a system exploring the new medium of motion picture style slide shows. In fact, all motion patterns determined for each photograph in a series can be recorded in a script file, for example, which can then be used to render a video with suitable incidental music on demand.

Since the photo-to-video system can generate motion photographs in a fully automatic manner, it can be further adopted for many applications, such as, for example, creating automatic walkthroughs of photograph galleries, motion photographs on website or server, electronic greeting cards, and personalized Karaoke.

CONCLUSION

Although the invention has been described in language specific to structural features and/or methodological acts, it is to be understood that the invention defined in the appended claims is not necessarily limited to the specific features or steps described.

What is claimed is:

1. A method comprising:
   accessing a static digital image which represents a static two-dimensional photograph;
   identifying, by a processor, a plurality of separate focus areas in the static digital image based on confidence values established for identifying a face;
   automatically determining, by the processor, based on relative locations of the plurality of separate focus areas in the static digital image, a motion pattern, the motion pattern including a trajectory from a first one of the focus areas to a second one of the focus areas and a duration;
   based on the trajectory from the first focus area to the second focus area and the duration, generating, by the processor, dynamic photo motion clip that includes a sequence of sub-photographs of a series of portions the static digital image taken along the trajectory from the first focus area to the second focus area; and
   generating output data, based on at least said dynamic photo motion clip, by resizing the sub-photographs to be played as a continuous sequence of video frames.

2. The method as recited in claim 1, further comprising: determining at least one audio clip, and
   wherein generating said output data based on at least said dynamic photo motion clip also includes generating said output data based on at least said dynamic photo motion clip and said at least one audio clip.

3. The method as recited in claim 2, wherein said audio clip includes a sub-music clip and determining said at least one audio clip includes selectively dividing music data into a plurality of sub-music clips.

4. The method as recited in claim 3, further comprising determining at least one boundary of at least one of said sub-music clips based on an audio signal energy level.

5. The method as recited in claim 4, further comprising detecting said audio signal energy level associated with said music data.

6. The method as recited in claim 3, further comprising determining at least one boundary of at least one of said sub-music clips based on at least one strong beat.

7. The method as recited in claim 6, further comprising detecting said at least one strong beat in an audio signal associated with said music data.

8. The method as recited in claim 3, further comprising determining at least one boundary of at least one of said sub-music clips based on at least one onset.

9. The method as recited in claim 8, further comprising detecting at least one onset in an audio signal associated with said music data.

10. The method as recited in claim 3, further comprising determining at least one boundary of at least one of said sub-music clips based on a defined period of time.

11. The method as recited in claim 2, wherein said audio clip includes music data.

12. The method as recited in claim 2, wherein said audio clip includes non-music data.

13. The method as recited in claim 2, further comprising associating said dynamic photo motion clip with at least one sub-music clip.

14. The method as recited in claim 1, wherein said static digital image includes captured digital image data associated with at least one photo subject.

15. The method as recited in claim 1, wherein said static digital image includes non-captured digital image generated by a computing device.

16. The method as recited in claim 1, wherein at least one of the plurality of focus areas is associated with facial image data.

17. The method as recited in claim 16, further comprising detecting said facial image data.

18. The method as recited in claim 1, wherein at least one of the plurality of focus areas is associated with salience image data.

19. The method as recited in claim 18, further comprising detecting said salience image data.

20. The method as recited in claim 1, further comprising:
    determining the confidence values associated with the focus areas; and
    sorting the focus areas based on the confidence values to establish a precedence of one or more focus areas.

21. The method as recited in claim 1, wherein said dynamic photo motion clip includes at least two portions of said static digital image that differ in image size.

22. The method as recited in claim 21, wherein each of said portions of said digital image includes at least one unique focus area of the plurality of focus areas.

23. The method as recited in claim 22, further comprising sorting each of said portions based on said unique focus areas.

24. The method as recited in claim 23, wherein said portions are sorted based on the confidence value associated with each of said unique focus areas.

25. The method as recited in claim 23, wherein said portions are sorted based on a type of focus area for each of said unique focus areas.

26. The method as recited in claim 1, wherein said portions are rectangular in shape.

27. The method as recited in claim 1, wherein said portions are non-rectangular in shape.

28. The method as recited in claim 2, further comprising rendering video data based on said audio clip and said dynamic photo motion clip.

29. The method as recited in claim 28, wherein said video data includes at least two different dynamic photo motion clips.

30. The method as recited in claim 29, wherein each of said dynamic photo motion clips is associated with a different sub-music clip within said audio clip.

31. The method as recited in claim 29, further comprising applying at least one transition effect when transitioning from a first dynamic photo motion clip to a second dynamic photo motion clip.

32. The method as recited in claim 31, wherein said transition effect is selected from a group of transition effects comprising a fade transition effect and a wipe transition effect.

33. The method as recited in claim 28, further comprising applying at least one style effect to at least a stylized portion of image data within said dynamic photo motion clip when rendering said video.

34. The method as recited in claim 28, wherein said style effect is selected from a group of style effects comprising a grayscale effect, a color tone effect, a sepia tone effect, a contrast effect, a watercolor effect, and a brightness effect.

35. The method as recited in claim 28, wherein said video data includes a plurality of frames associated with said dynamic photo motion clip.

36. The method as recited in claim 2, further comprising generating script data based on said audio clip and said dynamic photo motion clip.

37. The method as recited in claim 36, further comprising rendering video data based on said script data.

38. The method as recited in claim 1, further comprising automatically selecting the motion pattern based on the number of focus areas identified, wherein:
when two focus areas are identified, a first motion pattern is selected, and
when more than two focus areas are identified a second motion pattern is selected, different from the first motion pattern to be applied in said dynamic photo motion clip.

39. The method as recited in claim 1, wherein said motion pattern is associated with at least one sub-music clip.

40. The method as recited in claim 1, further comprising applying said determined motion pattern to said motion clip.

41. The method as recited in claim 1, wherein said motion pattern is selected from a group of motion patterns comprising still motion, light zooming-in motion, light zooming-out motion, panning motion, zooming-in motion, zooming-out motion, panning with light zooming-in motion, panning with light zooming-out motion, panning with zooming-in motion, and panning with zooming-out motion.

42. The method as recited in claim 1, wherein said motion pattern includes at least a starting point and an ending point within said digital image.

43. The method as recited in claim 1, wherein said motion pattern includes trajectory information.

44. The method as recited in claim 43, wherein said trajectory information is associated with simulated virtual camera motion from the first focus area at a first location in the static digital image to the second focus area at a second location within the static digital image.

45. The method as recited in claim 43, wherein said trajectory information is associated with at least a starting point at the first location within said static digital image.

46. The method as recited in claim 45, wherein said trajectory information is associated with an ending point at the second location within said static digital image.

47. The method as recited in claim 45, wherein said trajectory information is associated with a time parameter.

48. The method as recited in claim 43, wherein said trajectory information is associated with at least one speed control function.

49. The method as recited in claim 48, wherein said speed control function varies over time.

50. The method as recited in claim 48, wherein said speed control function is linearly tapered.

51. The method as recited in claim 48, wherein said speed control function is non-linearly tapered.

52. The method as recited in claim 48, wherein said speed control function is selected from a group of speed control functions comprising a zooming speed control function and a panning speed control function.

53. The method as recited in claim 43, wherein said trajectory information is based on at least one arc length parameter.

54. The method as recited in claim 43, wherein said trajectory information is based on at least one time parameter.

55. The method as recited in claim 1, further comprising generating at least one storyboard based on a plurality of dynamic photo motion clips.

56. A computer-readable storage medium including at least one tangible component, and having computer-implementable instructions for causing at least one processing unit to perform acts comprising:
accessing a static digital image which represents a static two dimensional photograph;
identifying a plurality of focus areas having different locations in the static digital image based on confidence values established for identifying a face;
automatically determining, based on the different locations of the plurality of separate focus areas in the static digital image, a motion pattern, the motion pattern including a trajectory from a first one of the focus areas to a second one of the focus areas;
configuring at least one dynamic photo motion clip that includes a sequence of sub-photographs of a series of portions of the static digital image taken along the trajectory from the first focus area to the second focus area; and
creating output data based on at least said dynamic photo motion clip, as a sequence of video frames to be played together sequentially as a motion video clip.

57. The computer-readable storage medium as recited in claim 56, further comprising:
analyzing at least one audio clip, and
wherein creating said output data based on at least said dynamic photo motion clip also includes generating said output data based on at least said dynamic photo motion clip and said at least one audio clip.

58. The computer-readable storage medium as recited in claim 57, wherein said audio clip includes a sub-music clip and analyzing said at least one audio clip includes selectively dividing music data into a plurality of sub-music clips.

59. The computer-readable storage medium as recited in claim 58, further comprising:
detecting audio signal energy level associated with said music data; and determining at least one boundary of at least one of said sub-music clips based on said audio signal energy level.

60. The computer-readable storage medium as recited in claim 58, further comprising:
detecting at least one strong beat in an audio signal associated with said music data; and
determining at least one boundary of at least one of said sub-music clips based on at least one strong beat.

61. The computer-readable storage medium as recited in claim 58, further comprising:
detecting at least one onset in an audio signal associated with said music data; and
determining at least one boundary of at least one of said sub-music clips based on said at least one onset.

62. The computer-readable storage medium as recited in claim 58, further comprising determining at least one boundary of at least one of said sub-music clips based on a defined period of time.

63. The computer-readable storage medium as recited in claim 57, further comprising associating said dynamic photo motion clip with at least one sub-music clip.

64. The computer-readable storage medium as recited in claim 56, further comprising detecting at least one focus area within the static digital image by recognizing at least one face, wherein only faces exceeding a predetermined size are recognized.

65. The computer-readable storage medium as recited in claim 56, wherein said focus area is associated with data selected from a group of data comprising facial image data and salience image data.

66. The computer-readable storage medium as recited in claim 56, further comprising:
determining the confidence values associated with said focus areas; and
sorting the focus areas based on the confidence value to establish a precedence of one or more focus areas.

67. The computer-readable storage medium as recited in claim 57, further comprising rendering video data based on said audio clip and said dynamic photo motion clip, and wherein said video data includes at least two different dynamic photo motion clips and each of said dynamic photo motion clips is associated with a different sub-music clip within said audio clip.

68. The computer-readable storage medium as recited in claim 57, further comprising applying at least one transition effect when transitioning from a first dynamic photo motion clip to a second dynamic photo motion clip.

69. The computer-readable storage medium as recited in claim 57, further comprising generating script data based on said audio clip and said dynamic photo motion clip.

70. The computer-readable storage medium as recited in claim 57, further comprising automatically selecting the motion pattern based on the number of focus areas identified, wherein:
when two focus areas are identified, a first motion pattern is selected, and
when more than two focus areas are identified a second motion pattern is selected, different from the first motion pattern.

71. The computer-readable storage medium as recited in claim 56, wherein said motion pattern is associated with at least one sub-music clip.

72. The computer-readable storage medium as recited in claim 56, wherein said motion pattern is selected from a group of motion patterns comprising still motion, light zooming-in motion, light zooming-out motion, panning motion, zooming-in motion, zooming-out motion, panning with light zooming-in motion, panning with light zooming-out motion, panning with zooming-in motion, and panning with zooming-out motion.

73. The computer-readable storage medium as recited in claim 56, wherein said motion pattern includes trajectory information associated with simulated virtual camera motion with regard to said digital image.

74. The computer-readable storage medium as recited in claim 73, wherein said trajectory information is associated with at least one speed control function.

75. The computer-readable storage medium as recited in claim 74, wherein said speed control function varies over time.

76. The computer-readable storage medium as recited in claim 73, wherein said trajectory information is based on at least one arc length parameter.

77. The computer-readable storage medium as recited in claim 73, wherein said trajectory information is based on at least one time parameter.

78. An apparatus comprising:
a processor; and
computer storage media maintaining instructions that, when executed by the processor, implement logic configured to:
access a static digital image which represents a static two dimensional photograph;
identify a plurality of separate focus areas in the static digital image based on confidence values established for identifying a face;
automatically determine, by the processor, based on relative locations of the plurality of separate focus areas in the static digital image, a motion pattern, the motion pattern including a trajectory from a first focus area to a second focus area;
based on the trajectory from the first focus area to the second focus area, generate at least one dynamic photo motion clip that includes a sequence of sub-photographs of a series of portions the static digital image taken along the trajectory from the first focus area to the second focus area; and
produce output data based on at least said dynamic photo motion clip, as a sequence of video frames to be played together sequentially as a motion video clip.

79. The apparatus as recited in claim 78, wherein said logic is further configured to process at least one audio clip and produce said output data based on at least said dynamic photo motion clip and said at least one audio clip.

80. The apparatus as recited in claim 79, wherein said audio clip includes a sub-music clip and said logic is configured to selectively divide music data into a plurality of sub-music clips.

81. The apparatus as recited in claim 80, wherein said logic is further configured to detect an audio signal energy level associated with said music data and determine at least one boundary of at least one of said sub-music clips based on said audio signal energy level.

82. The apparatus as recited in claim 80, wherein said logic is further configured to detect at least one strong beat in an audio signal associated with said music data, and determine at least one boundary of at least one of said sub-music clips based on at least one strong beat.

83. The apparatus as recited in claim 80, wherein said logic is further configured to detect at least one onset in an audio signal associated with said music data, and determine at least one boundary of at least one of said sub-music clips based on said at least one onset.

84. The apparatus as recited in claim 80, wherein said logic is further configured to determine at least one boundary of at least one of said sub-music clips based on a defined period of time.

85. The apparatus as recited in claim 79, wherein said logic is further configured to associate said dynamic photo motion clip with at least one sub-music clip.

86. The apparatus as recited in claim 78, wherein said logic is further configured to detect at least one focus area within the digital image by recognizing at least one face, wherein only faces exceeding a predetermined size are recognized.

87. The apparatus as recited in claim 78, wherein said focus areas are associated with data selected from a group of data comprising facial image data and salience image data.

88. The apparatus as recited in claim 78, wherein said logic is further configured to:
determine the confidence values associated with said focus areas; and
sort the focus areas based on the confidence values to establish a precedence of one or more focus areas.

89. The apparatus as recited in claim 79, wherein said logic is further configured to render video data based on said audio clip and said dynamic photo motion clip, and wherein said video data includes at least two different dynamic photo motion clips and each of said dynamic photo motion clips is associated with a different sub-music clip within said audio clip.

90. The apparatus as recited in claim 78, wherein said logic is further configured to apply at least one transition effect when transitioning from a first dynamic photo motion clip to a second dynamic photo motion clip.

91. The apparatus as recited in claim 79, wherein said logic is further configured to generate script data based on said audio clip and said dynamic photo motion clip.

92. The apparatus as recited in claim 78, wherein said logic is further configured to automatically select the motion pattern based on the number of focus areas identified, wherein:

when two focus areas are identified, a first motion pattern is selected, and when more than two focus areas are identified a second motion pattern is selected, different from the first motion pattern.

93. The apparatus as recited in claim 78, wherein said motion pattern is associated with at least one sub-music clip.

94. The apparatus as recited in claim 78, wherein said motion pattern is selected from a group of motion patterns comprising still motion, light zooming-in motion, light zooming-out motion, panning motion, zooming-in motion, zooming-out motion, panning with light zooming-in motion, panning with light zooming-out motion, panning with zooming-in motion, and panning with zooming-out motion.

95. The apparatus as recited in claim 78, wherein said motion pattern includes trajectory information associated with simulated virtual camera motion with regard to said digital image.

96. The apparatus as recited in claim 95, wherein said trajectory information is associated with at least one speed control function.

97. The apparatus as recited in claim 96, wherein said speed control function varies over time.

98. The apparatus as recited in claim 95, wherein said trajectory information is based on at least one arc length parameter.

99. The apparatus as recited in claim 95, wherein said trajectory information is based on at least one time parameter.

* * * * *